United States Patent

Colber, Jr. et al.

[11] Patent Number: 5,842,552
[45] Date of Patent: Dec. 1, 1998

[54] SELF-ADJUSTING DRIVE-CONTROL CABLE FOR A LAWN MOWER

[75] Inventors: William E. Colber, Jr., McRae; Charles A. Eakins, Jr., Swainsboro, both of Ga.

[73] Assignee: White Consolidated Industries, Inc., Cleveland, Ohio

[21] Appl. No.: 773,138

[22] Filed: Dec. 26, 1996

[51] Int. Cl.⁶ ............................. F16D 13/75; F16C 1/22
[52] U.S. Cl. .................... 192/111 A; 74/501.5 R; 74/502.4; 74/502.2
[58] Field of Search ............ 71/502.2, 501.5 R, 71/502.4; 192/111 A; 188/196 B; 56/10.8, 11.3, 11.7

[56] References Cited

U.S. PATENT DOCUMENTS

| | | | |
|---|---|---|---|
| 4,066,154 | 1/1978 | Ross | 188/196 BA |
| 4,344,518 | 8/1982 | Gilmore | 192/111 A |
| 4,378,713 | 4/1983 | Haskell et al. | 74/501.5 R |
| 4,543,849 | 10/1985 | Yamamoto et al. | 74/501.5 R |
| 4,669,330 | 6/1987 | Stocker | 74/501.5 R |
| 4,688,445 | 8/1987 | Spease et al. | 74/501.5 R |
| 4,693,137 | 9/1987 | Deligny | 74/501.5 R |
| 4,747,256 | 5/1988 | Sadakane | 56/10.8 X |
| 4,753,123 | 6/1988 | Stormont | 74/500.5 |
| 4,762,017 | 8/1988 | Jaksic | 74/500.5 |
| 4,787,263 | 11/1988 | Jaksic | 74/501.5 R |
| 4,793,205 | 12/1988 | Guidicelli | 74/501.5 R |
| 4,793,206 | 12/1988 | Suzuki | 74/501.5 R |
| 4,798,100 | 1/1989 | Baumgarten | 74/501.5 R |
| 4,829,845 | 5/1989 | Suzuki | 74/502.4 |
| 4,887,705 | 12/1989 | Solano et al. | 192/111 A |
| 4,892,003 | 1/1990 | Quinlan | 74/501.5 R |
| 4,892,004 | 1/1990 | Segura et al. | 74/501.5 R |
| 4,987,793 | 1/1991 | Baumgarten et al. | 74/502 |
| 5,144,856 | 9/1992 | Roca | 74/501.5 R |
| 5,178,034 | 1/1993 | Reasoner | 74/501.5 R |
| 5,222,413 | 6/1993 | Gallas et al. | 74/502.4 |
| 5,259,265 | 11/1993 | Gabas et al. | 74/502.4 |
| 5,261,292 | 11/1993 | Gabas et al. | 74/501.5 R |
| 5,261,293 | 11/1993 | Kelley | 74/502.6 |
| 5,377,556 | 1/1995 | Byrnes | 74/502.6 |
| 5,419,216 | 5/1995 | Hinschlager | 74/502.2 |
| 5,485,762 | 1/1996 | Rothman | 74/501.5 R |
| 5,680,748 | 10/1997 | Barnard | 74/502.4 X |

FOREIGN PATENT DOCUMENTS 221627  5/1987  European Pat. Off. .

Primary Examiner—Richard M. Lorence
Assistant Examiner—Ankur Parekh
Attorney, Agent, or Firm—Pearne, Gordon, McCoy & Granger LLP

[57] ABSTRACT

A power-driven lawn mower including a push-pull cable having a core connecting a bail arm pivotally supported on the handle and a clutch mechanism which engages and disengages the drive system. A control case is secured to the handle between the bail arm and the clutch assembly and has a side wall which forms a longitudinally extending groove with an open outer side. The handle engages the control case adjacent the outward side of the groove. A self-adjusting mechanism for the cable includes a slider longitudinally movable within the groove of the control case, a spring element, and a lock pin. The slider engages a rear end of a conduit of the cable and has a rack of longitudinally spaced ratchet teeth thereon. The spring element forwardly urges the slider toward the rear end of the conduit. The lock pin is secured within the control case and is engagable with the ratchet teeth of the slider for allowing forward movement of the slider relative to the control case and preventing rearward movement of the slider relative to the control case to automatically adjust tension of the cable. A preferred embodiment is disclosed wherein the slider has a opening and a screw selectively extends through the opening to prevent forward movement of the slider when the slider is in a rearward most position so that the self-adjusting mechanism can be pre-assembled in a fully pre-loaded condition.

15 Claims, 4 Drawing Sheets

Fig. 1

SELF-ADJUSTING DRIVE-CONTROL CABLE FOR A LAWN MOWER

BACKGROUND OF THE INVENTION

The present invention generally relates to outdoor power equipment such as power-driven lawn mowers and, more particularly, to cable-operated drive systems for such power equipment.

Lawn mowers and the like often have cable-operated drive systems which enable the drive system to be engaged or dis-engaged with a remote lever or bail arm. The cable is typically a push-pull type cable having an outer sheath or conduit and a flexible inner cable or core which is pushed and pulled through the conduit. The core connects the drive system with the bail arm so that movement of the bail arm actuates the drive system. The length of the core is adjusted so that the drive system is actuated within it's optimum range. Over time, however, The cable can develop excessive slack which takes the drive system out of the optimum operating range. The slack can be due to wear of drive-system components, core-stretch, spring stretch, and/or tolerance stack up.

The excessive slack is removed by manually adjusting the cable length so that the drive system is back within the optimum operating range. However, some operators fail to adjust the cable at all and some inexperienced operators misadjust the cable. Therefore, there is a need in the art for an improved cable-operated drive system for lawn mowers and the like.

BRIEF SUMMARY OF THE INVENTION

The present invention provides a lawn mower having a cable-operated drive system which overcomes at least some of the above noted problems of the related art. According to the invention the lawn mower includes a handle, a lever pivotally supported at a rear end of the handle, a clutch mechanism for engaging and disengaging the drive system, a control case secured to the handle between the lever and the clutch assembly, a cable having a conduit and a flexible core extending through the conduit, and a self-adjusting mechanism for the cable. The core of the cable connects the lever and the clutch mechanism. The self-adjusting mechanism includes a slider supported by the control case, a spring element, and a lock pin. The slider is engagable with a rear end of the conduit and has ratchet teeth thereon. The spring element forwardly urges the slider toward the rear end of the conduit. The lock pin is secured to the control case and is engagable with the ratchet teeth of the slider for allowing forward movement of the slider relative to the control case and preventing rearward movement of the slider relative to the control case to automatically adjust tension of the cable.

According to a preferred embodiment of the present invention, the control case has a side wall which forms a longitudinally extending groove having an open outer side and the slider is longitudinally movable within the groove. The handle engages the control case adjacent the groove to at least partially close the open outer side of the groove. Preferably, the groove has forward and rearward facing abutments for limiting longitudinal movement of the slider. In this preferred embodiment, the slider is located outside the control case and the lock pin is located within the control case. The lock pin preferably has a handle portion extending out of the control case for manually disengaging the lock pin from the slider.

According to another preferred embodiment of the present invention, the self-adjusting mechanism further includes means for selectively securing the slider in a rearward-most position. The securing means preferably includes a opening in the slider and a removable fastener selectively extending through the opening to prevent forward movement of the slider. When the control case includes left and right halves, the removable fastener can advantageously be a screw for securing the left and right halves together.

BRIEF DESCRIPTION OF THE SEVERAL VIEWS OF THE DRAWING

These and further features of the present invention will be apparent with reference to the following description and drawings, wherein.

DETAILED DESCRIPTION OF THE INVENTION

Figure 1:
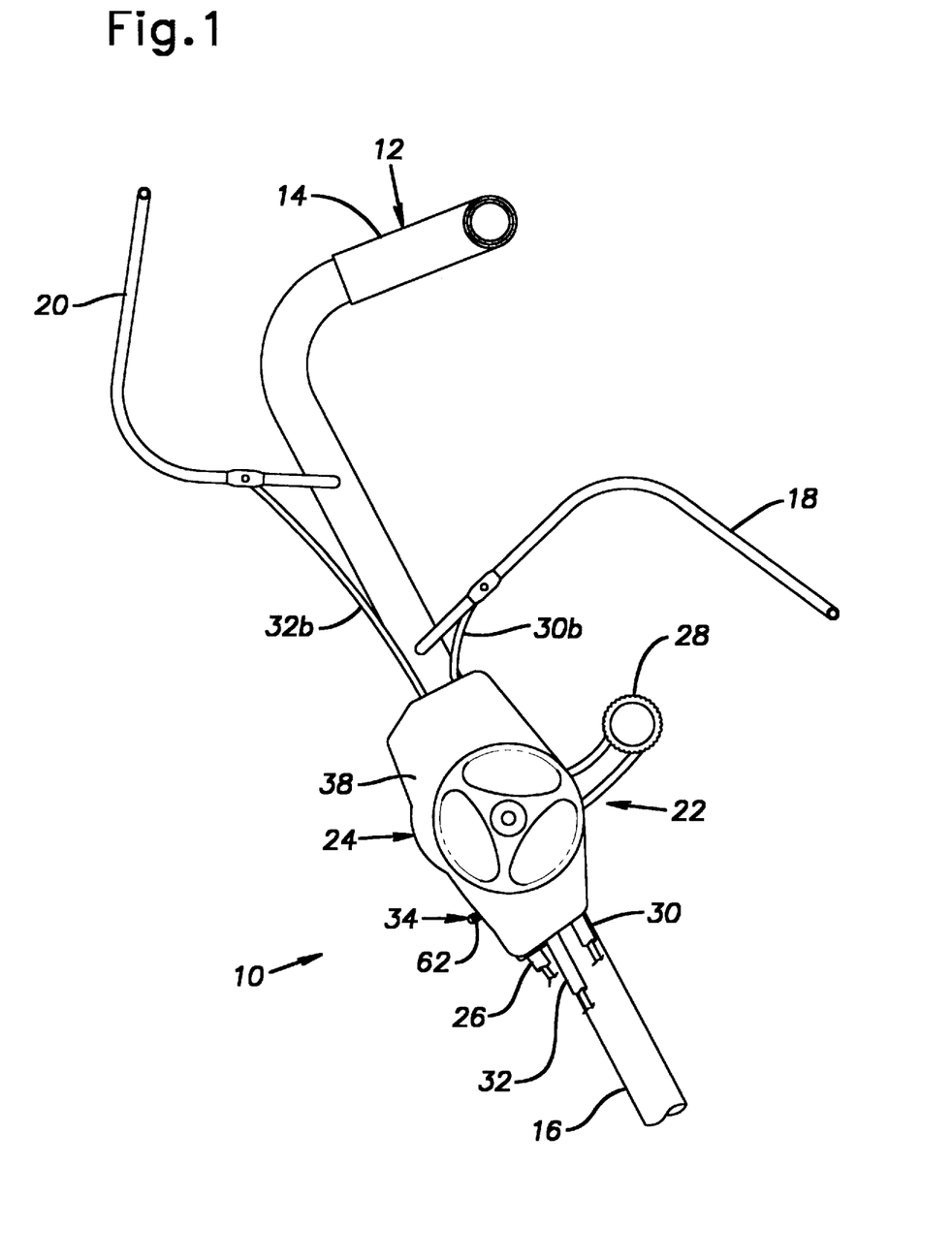
FIG. 1 is an elevational view of a lawn mower according to the present invention showing an inner side of a control assembly.
Figures 2, 3:
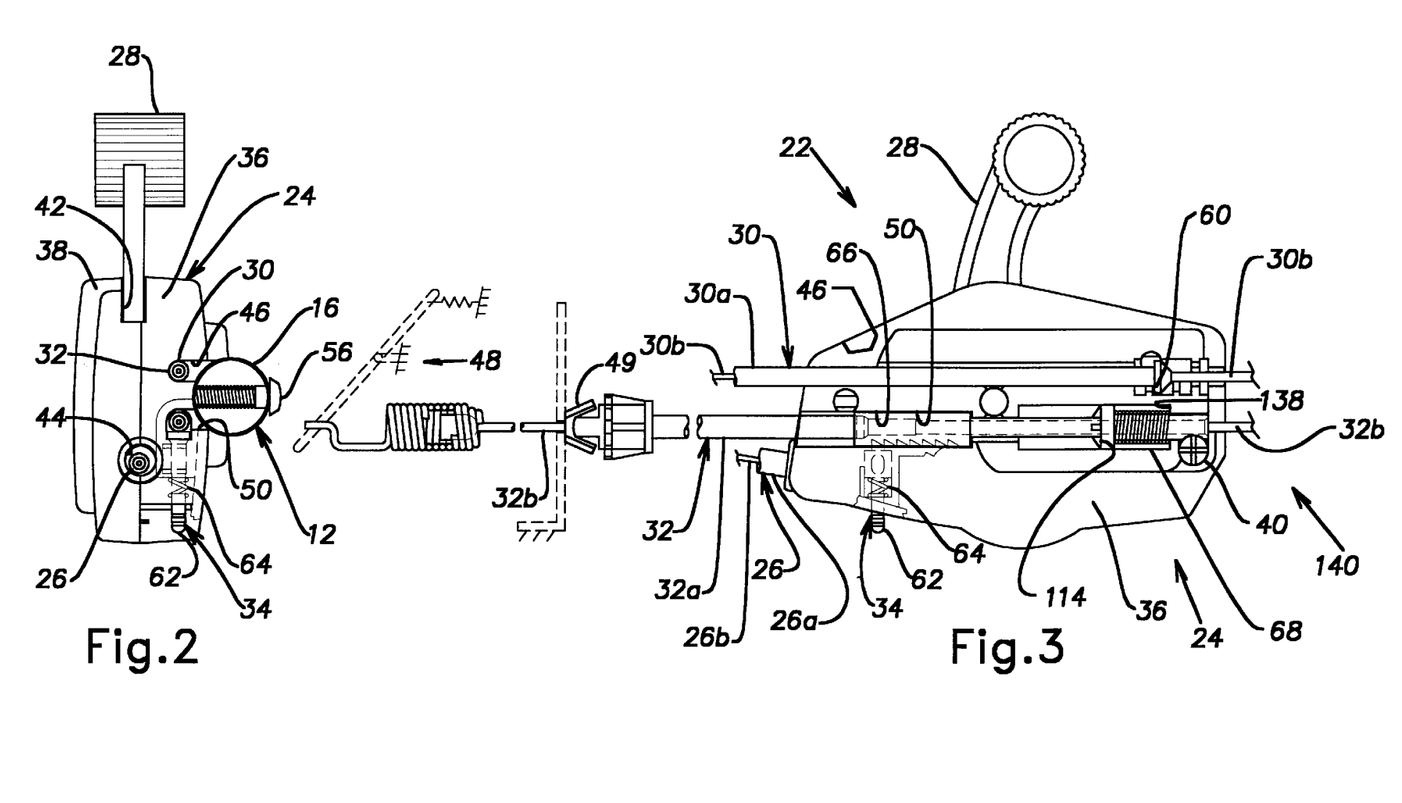
FIG. 2 is a elevational view of front end of the control assembly of FIG. 1.
FIG. 3 is an elevational view of an outer side of the control assembly of FIG. 1 with a handle of the mower removed for clarity.
Figures 4, 5, 6:
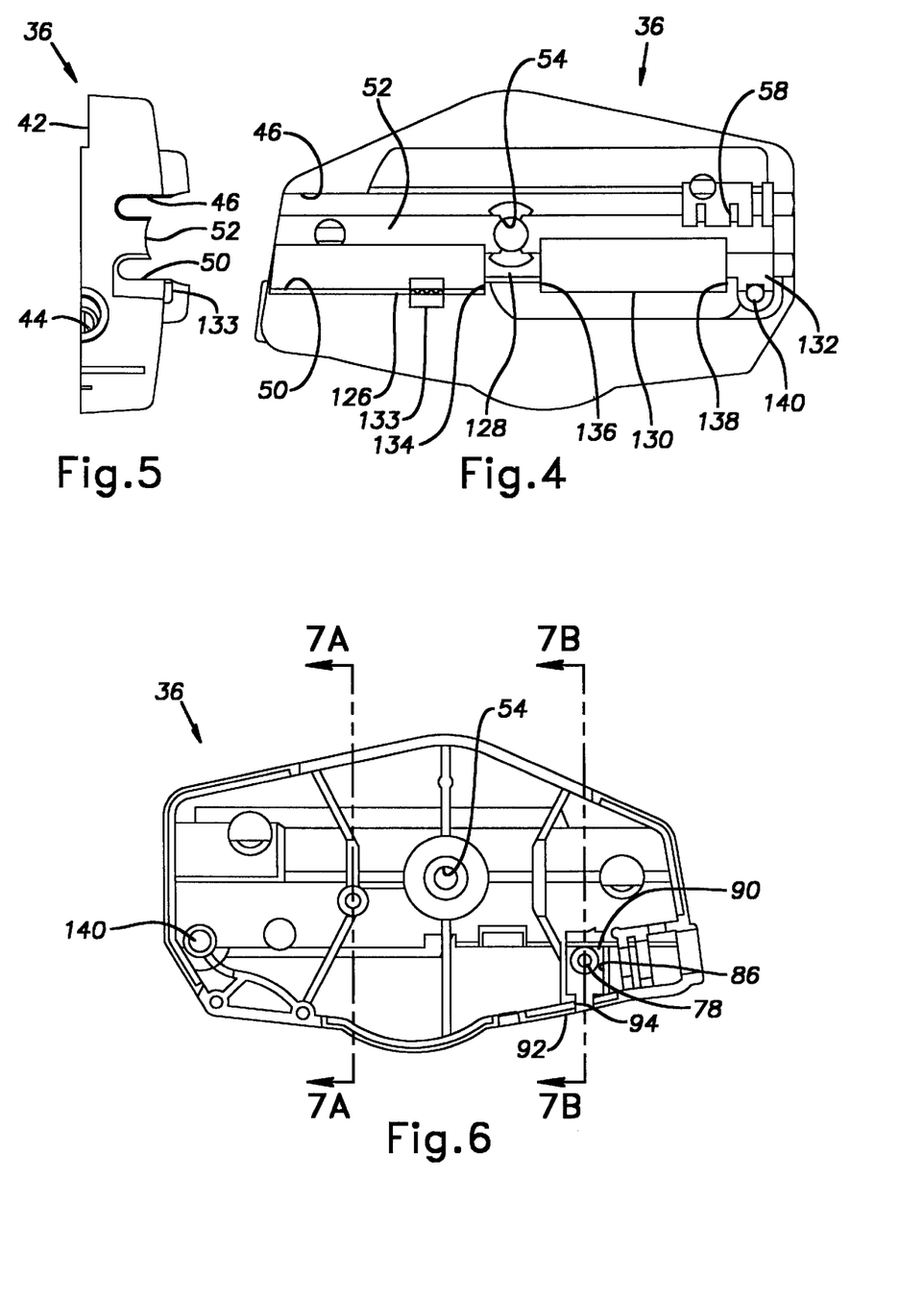
FIG. 4 is an elevational view of an outer side of a case left half.
FIG. 5 is an elevational view of a front end of the left case half.
FIG. 6 is an elevational view of an inner side of the case left half.
Figure 7A:
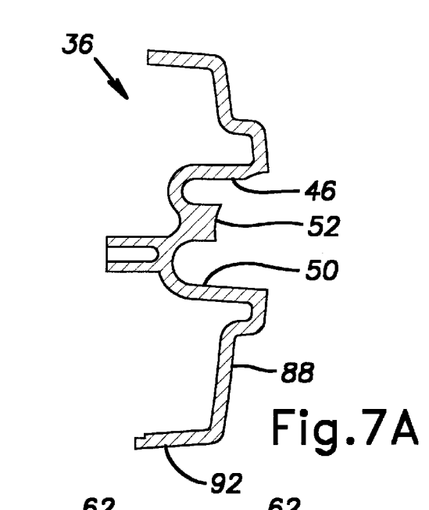
FIG. 7A is a cross-sectional view of the left half of the case taken along line 7A—7A of FIG. 6.
Figure 7B:
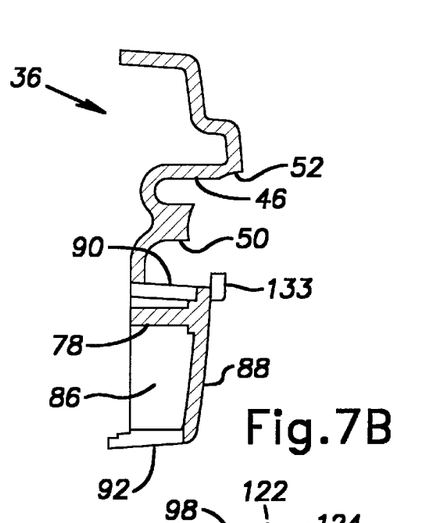
FIG. 7B is a cross-sectional view of the left half of the case taken along line 7B—7B of FIG. 6.

FIGS. 1–3 illustrate a walk-behind, power-driven, lawn mower 10 according to the present invention. The mower 10 has a tubular handle 12 which is bent to form a generally horizontal grasping portion 14 and a pair of generally parallel supporting portions 16 (only one shown) downwardly extending from the ends of the grasping portion 14 to the wheeled deck of the lawn mower 10. Pivotally mounted between the supporting portions 16 of the handle 12 are first and second levers or bail arms 18, 20. Secured to the inner side of a left one of the handle supporting portions 16, below the bail arms 18, 20, is a control assembly 22.

The control assembly 22 includes a housing or case 24, a speed-control cable 26, a speed-select lever 28, a manual-zone-restart (MRZ) cable 30, a drive-control cable 32, and a self-adjusting mechanism 34 for the drive-control cable 32. Each of the cables 26, 30, 32 preferably include a flexible outer cable or conduit 26a, 30a, 32a and a flexible inner cable or core 26b, 30b, 32b. The cores 26b, 30b, 32b extend through the respective conduits 26a, 30a, 32a and transmit motion by moving through the respective conduits 26a, 30a, 32a.

The case 24 is preferably a generally hollow body formed by left and right halves 36, 38. The left and right halves 36, 38 of the case 24 are held together by removable fasteners 40 such as, for example, screws. The case halves 36, 38 are preferably molded from a suitable plastic resin.

The speed-select lever 28 is mounted within the case 24 and extends through an opening 42 in the top of the case 24 and formed by the two case halves 36, 38. The speed-control cable 26 connects a transmission assembly located at the wheeled deck (not shown) of the lawn mower 10 with the speed-select lever 28. The speed-control cable 26 extends through an opening 44 at the forward end of the case 24. The speed-select lever 28 enables the operator to select one of two or more drive speeds for the lawn mower 10. Movement of the speed-select lever 28 pulls or retracts the core 26b of the speed-control cable which actuates the transmission assembly to obtain the desired speed.

The MRZ cable 30 preferably connects an actuatable cut-off mechanism, typically the throttle valve, of the lawn mower 10 with the first bail arm 18. The MRZ cable 30 extends through a first or upper groove 46 formed in the outer side of the case left half 36. The cut-off mechanism is spring biased to a cut-off or kill position wherein the power source of the lawn mower, such as an i-c engine, is inoperable. Rotational movement of the first bail arm 18 by the operator, from a first or non-operating position (shown in FIG. 1) to a second or operating position which is adjacent the grasping portion 14 of the handle 12 (not shown), rearwardly pulls or tensions the core 30b of the MRZ cable 30. The rearward movement of the core 30b of the MRZ cable 30 overcomes the spring bias of the cut-off mechanism and actuates the cut-off mechanism to an operating position wherein the power source of the lawn mower 10 is operable. When the operator releases the first bail arm 18, the spring bias of the cut-off mechanism forwardly pulls the core 30b of the MRZ cable 30 which actuates the cut-off mechanism to the cut-off position which stops the power source and renders it inoperable. The forward movement of the core 30b of the MRZ cable 30 also rotates the first bail arm 18 from the operating position to the non-operating position.

The core 32b of the drive-control cable 32 extends from an actuatable clutch mechanism 48 of the lawn mower 10, through a second or lower groove 50 formed in the outer side of the case left half 36, to the second bail arm 20. The core 32b is connected to a clutch arm 49 of the clutch mechanism 48 which is spring biased to a non-driving position wherein power is not supplied to wheels of the lawn mower 10. Rotational movement of the second bail arm 20 by the operator, from a first or non-operating position (shown in FIG. 1) to a second or operating position which is adjacent the grasping portion 14 of the handle 12 (not shown), rearwardly pulls or tensions the core 32b of the drive-control cable 32. The rearward movement of the core 32b of the drive-control cable 32 overcomes the spring bias of the clutch mechanism 48 and pivots the clutch arm which actuates the clutch mechanism 48 to a driving position wherein power is provided to the wheels of the lawn mower 10. When the operator releases the second bail arm 20, the spring bias of the clutch mechanism 48 rotates the clutch arm and forwardly pulls the core 32b of the drive-control cable 32 which actuates the clutch mechanism to the non-driving position. The forward movement of the core 32b of the drive-control cable 32 also rotates the second bail arm 20 from the operating position to the non-operating position.

As best shown in FIGS. 4–7, the left half 36 of the case 24 has a longitudinally extending recess 52 formed in an outer side thereof. The recess 52 is sized and shaped to receive an inner side of the handle supporting portion 16 therein. An opening 54 is provided generally at the center of the recess 52 for receiving a fastener 56 which extends through the handle 12 to connect the case 24 to the handle 12 (as best shown in FIG. 2).

The longitudinally extending first and second grooves 46, 50 are also formed in the outer side of the case left half 36. The first and second grooves 46, 50 preferably extend inwardly from the recess 52. The first groove 46 is located above the second groove 50 and is generally parallel and vertically spaced apart therefrom. The first groove 46 is circular in cross-section and is sized for receiving the MRZ cable 30 therein. The rearward end of the first groove 46 has a series of pockets 58 for receiving a flanged fitting 60 (FIG. 3) of the MRZ cable 30. The fitting 60 can be moved to any of the pockets 58 to manually adjust the length of the MRZ cable 30.

Figure 8:
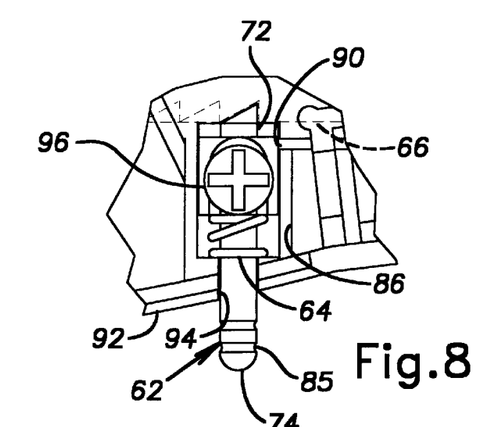
FIG. 8 is an enlarged and fragmented elevational view of the inner side of the left case half in the area of a lock tab.

The second groove 50 is sized and shaped for receiving the drive-control cable 32 and the self-adjusting mechanism 34 therein as discussed in more detail below. As best shown in FIGS. 2, 3 and 8, the self-adjusting mechanism 34 includes a lock tab 62, a lock-tab spring 64, a slider 66, and a slider spring 68.

Figure 9:
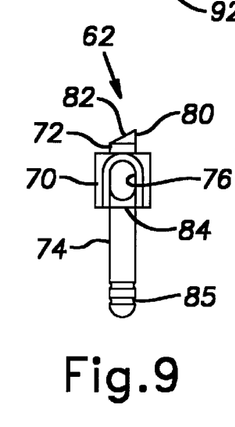
FIG. 9 is an elevational view of an inner side of the lock tab.
Figure 10:
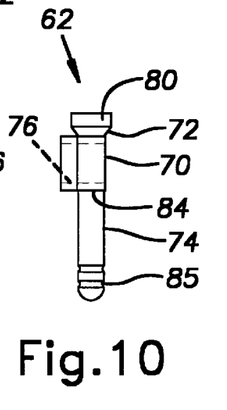
FIG. 10 is an elevational view of a front end of the lock tab.

As best shown in FIGS. 9 and 10, the lock tab 62 includes body portion 70, a tooth portion 72, and a handle portion 74. The lock tab 62 is preferably integrally molded of a suitable material such as, for example, a glass filled nylon. The body portion 70 is generally rectangularly shaped and has an opening 76 transversely extending therethrough. The opening 76 is sized for receiving a post 78 (FIG. 7B) therein and is vertically elongated so that the lock tab 62 can be vertically moved relative to the post 78.

The tooth portion 72 of the lock tab 62 upwardly extends from the top of the body portion 70. The tooth portion 72 is sized and shaped to cooperate with the slider 66 and has a substantially vertical forward surface 80 and an angled rearward surface 82. The rearward surface 82 is preferably at an angle of about 30 degrees relative to horizontal.

The handle portion 74 of the lock tab 62 downwardly extends from the bottom of the body portion 70. The handle portion 74 is generally cylindrically-shaped and has an outer diameter sized to form a downward facing abutment 84 at the bottom of the body portion 70. The outer diameter of the handle portion 74 is smaller than the outer diameter of the lock-tab spring 64 so that the lock tab spring 64 can be received thereon. The handle portion 74 is provided with a finger grip 85 at a lower end thereof. The finger grip 85 is preferably a pair of circumferentially extending grooves. It is noted, however, that other suitable types of finger grips 85 such as, for example, a knurled surface can be utilized.

As best shown in FIGS. 4–8, the inner side of the case left half 36 has a pocket 86 formed therein which is sized an shaped for the lock tab 62. The cylindrically-shaped post 78 horizontally and inwardly extends from the inner side of the case side wall 88. An opening 90 is formed at the top of the pocket 82 to communicate the pocket with the second groove 50 for passage of the tooth portion 72 of the lock tab 62 into the second groove 50. The pocket 86 is formed adjacent the bottom wall 92 of the case left half 36. An opening 94 is formed in the bottom wall 92 for passage of the handle portion 74 of the lock tab 62 therethrough.

Vertical movement of the lock tab 62 is limited by the post 78 extending through the body portion opening 76. As best shown in FIG. 8, the lock tab 62 is within the pocket 86, with the tooth portion 72 upwardly extending through pocket top opening 90 and the handle portion 74 downwardly extending through the pocket bottom opening 94. The lock tab 62 is retained on the post 78 with a set screw 96 secured to the inner end of the post 78. The lock-tab spring 64 is retained about the handle portion 74 between the abutment 84 at the bottom of the lock-tab body portion 70 and the case bottom wall 92. The lock-tab spring 64 is a helical compression spring which urges the lock tab 62 in an upward direction so that the tooth portion 72 engages the slider 66. The lock tab 62 can be disengaged from the slider 66 by grasping the finger grip 85 and downwardly pulling the handle portion 74.

Figure 11:
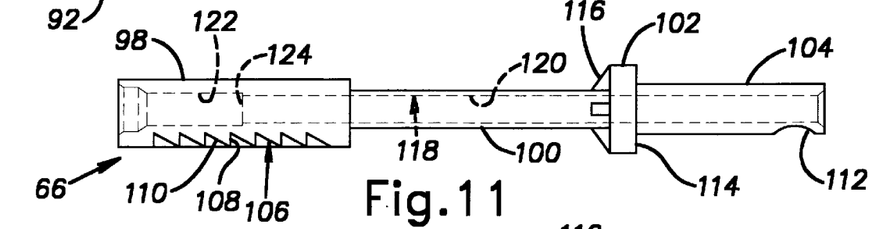
FIG. 11 is an elevational view of an outer side of a slider of the control assembly of FIG. 3.
Figure 12:
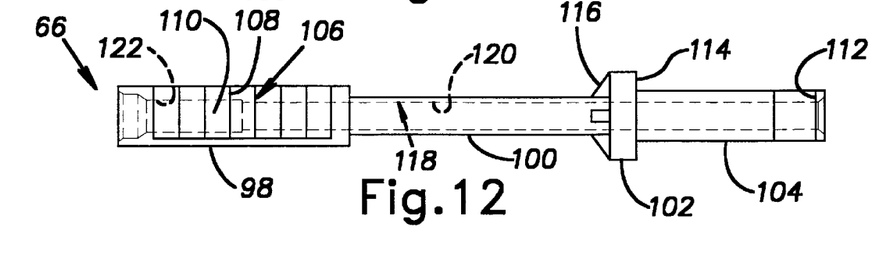
FIG. 12 is a bottom plan view of the slider of FIG. 11.

As best shown in FIGS. 11 and 12, the slider 66 has a forward portion 98, first and second central portions 100, 102, and a rear portion 104. The slider 66 is preferably integrally molded of a suitable material such as, for example, a glass filled nylon. The forward portion 98 of the slider 66 is rectangularly-shaped in cross-section and has a downwardly facing rack of teeth 106 formed in a bottom thereof. Each of the teeth 106 is sized and shaped to cooperate with the lock tab tooth portion 72 and has a substantially vertical rearward surface 108 and an angled forward surface 110. The forward surface 110 is preferably at an angle of about 30 degrees relative to horizontal. The teeth 106 are preferably open at an outer side of the slider 66 and closed at an inner side of the slider 66.

The rear portion 104 of the slider is generally circularly-shaped in cross-section and has an outer diameter smaller than the inner diameter of the slider spring 68 to receive the slider spring 68 thereon. A transversely extending and downwardly facing opening or notch 112 is formed in the bottom of the rear portion 104. The notch 112 is sized for receiving at least a portion of one of the case fasteners 40 therein to prevent longitudinal movement of the slider 66 within the second groove 50. The illustrated notch 112 is generally arcuate in a vertically and longitudinally extending plane.

The second central portion 102 of the slider 66 is at the forward end of the rear portion 104. The second central portion 102 is generally circularly shaped in cross-section and has an outer diameter larger than the outer diameter of the rear portion 104 to form a rearward facing abutment 114. Preferably, the outer diameter of the second central portion 102 is larger than the outer diameter of the slider spring 68.

The first central portion 100 of the slider 66 extends from the rearward end of the forward portion 98 to the forward end of the second central portion 100. The first central portion is 100 circularly shaped in cross-section and has an outer diameter smaller than each of the other portions 98, 102, 104 of the slider 66. Ribs 116 are preferably provided at the forward end of the second central portion 102 to provide support thereto.

A longitudinally extending passage 118 is provided at the central axis of the slider 66. The passage 118 is circularly-shaped in cross-section and is sized for passage of the drive-control cable 30 through the slider 66. The passage 118 is preferably provided with a first portion 120 sized for passage of the core 32b of the drive-control cable 32 and a second portion 122 at a forward end of the slider 66 sized for passage of the conduit 32a of the drive-control cable 32. The diameter of the first portion 120 of the passage 118 is smaller than the diameter of the second portion 122 of the passage 118 to form a forward facing abutment 124 for the conduit 32a of the drive-control cable 32.

As best shown in FIGS. 5–7B, the second groove 50 is sized and shaped for receiving the slider 66 therein. The second groove 50 has a forward pocket 126, first and second central pockets 128, 130, and a rear pocket 132. The forward pocket 126. The forward pocket 126 is sized and shaped for closely receiving the forward portion 98 of the slider 66 therein. Preferably, a rib 133 is provided along a portion of the forward pocket 126 for retaining the slider 66 in the second groove 50. The second central pocket 130 is sized for closely receiving the second central portion 102 of the slider 66 therein. The first central pocket 128 connects the rear end of the forward pocket 126 and the front end of the second central pocket 130. The first central pocket 128 is sized for passage of the first central portion 100 of the slider 66 therethrough. The first central pocket 128 is smaller than the forward pocket 126 and the second central pocket 130 to form forward and rearward facing abutments 134, 136 respectively. The rearward pocket 132 is sized and shaped for closely receiving the rearward portion 104 of the slider 66 therein. The rearward pocket 132 is sized smaller than the second central pocket 130 to form a forward facing abutment 138. An opening 140 for the case fastener 40 is adjacent the bottom of the rearward pocket such that the head of the fastener 40 extends into the rearward pocket 132 to cooperate with the notch 122 of the slider 66.

As best shown in FIGS. 1–3, the slider 66 is positioned within the second groove 50. The slider spring 68 is positioned on the rearward portion 104 of the slider 66 between the rearward facing abutment 114 of the slider and the forward facing abutment 138 of the second groove 50. The slider spring is a helical compression spring which urges the slider 66 in a forward direction within the second groove 50. The lock tab 62 engages the slider 66 to prevent rearward movement of the slider 66 but to allow forward ratcheting of the slider 66.

The conduit 32a of the drive-control cable 32 extends from the bracket 49 to the slider 66 of the self-adjusting mechanism 34. The forward or lower end of the conduit 32a engages the bracket 49 which is secured to the main body of the lawn mower 10. The upper or rear end of the conduit 32a of the drive-control cable 32 extends into the passage 118 of the slider and engages the forward facing abutment 124 of the slider 66. Preferably, the conduit 32a is press-fit into the passage 118 or otherwise secured to the slider 66.

The control assembly 22 is preferably pre-assembled for later attachment to the lawn mower 10. The control assembly 22 is also preferably provided with means 140 for retaining the self-adjusting mechanism 34 in a fully pre-loaded condition, that is, wherein the slider 66 is in its rearward most position and has a full length of travel through the ratchet mechanism. In the illustrated embodiment, the retaining means 140 includes one of the case fasteners 40 and the slider notch 112. The slider 66 is pre-loaded by manually disengaging the lock pin 62 from the slider 66, as described above, and manually pushing the slider 66 in a rearward direction, along with the conduit 32a, to compress the slider spring 68. When the slider notch 112 is aligned with the opening 140 for the case fastener 40, the case fastener 40 is tightened until the head is positioned within the slider notch 112 to block or prevent longitudinal movement of the slider 66 within the second groove 50. The lock tab 62 is then released to preferably engage the forward most tooth 106 of the slider 66. It is noted that the securing means could include other elements such as, for example, the slider could have a tab which is held by a screw or a latch or pin could removably block the groove in front of the slider.

The case 24 of the control assembly 22 is later attached to the handle 12 of the lawn mower 10. The forward or lower end of the core 32b of the drive-control cable 32 is attached to the clutch mechanism 48 with the core 32b extending through the bracket 49. The rear or upper end of the core 32b of the drive-control cable 32 is attached to the second bail arm 20. The case fastener 40 is then backed out to release the slider 66. The slider spring 68 urges the slider 66 forward within the second groove 50 to automatically adjust or tension the drive-control cable 32 to its proper position, that is, the slider 66 is urged forward until the conduit 32a of the drive-control cable 32 is compressed between the slider 66 and the bracket 49 to remove any slack in the core 32b. The case fastener 40 is then tightened behind the slider 66 to secure the left and right halves 36, 38 of the case 24 together.

When the operator desires to supply power to the wheels of the lawn mower 10, the second bail arm 20 is rotated to the operating position. The rotation of the second bail arm 20 rearwardly pulls or tensions the core 32b of the drive-control cable 32 which overcomes the spring bias of the clutch mechanism 48 and actuates the clutch mechanism 48 to supply power to the wheels. Rearward movement of the conduit 32a of the drive-control cable 32 is prevented by the slider 66 which is locked by the lock pin 62.

When the operator desires to cut-off power to the wheels of the lawn mower 10, the second bail arm 20 is released. The spring bias of the clutch mechanism 48 forwardly pulls the core 32b of the drive-control cable 32 which actuates the clutch mechanism 48 to cut-off power to the wheels and rotates the second bail arm 20 to the non-operating position. Forward movement of the conduit 32a of the drive-control cable and slider 66 is prevented by the bracket 49.

Over time, the distance between the clutch mechanism 48 and the bracket 49 is shortened and causes slack in the drive-control cable 32. The self-adjusting mechanism 34 automatically removes this slack so that the drive-control cable 32 does not have to be manually re-adjusted. Because of the slack in the drive-control cable 32, the conduit 32a is no longer compressed between the bracket 49 and the slider 66. Therefore, the slider spring 68 urges the slider 66 forward and the lock pin 62 is downwardly moved. Once the lock pin 62 is past the next tooth 106 of the slider 66, the lock-pin spring 64 resiliently moves the lock pin 62 upward to again engage the slider 66. In this manner, the slider 66 forwardly ratchets until the conduit 32a is again compressed between the slider 66 and the bracket 49. The forward movement of the slider 66 increases the effective distance of the cable 32 between bracket 49 and the second bail arm 20. The increase is generally equal to the amount that the distance between the clutch mechanism 48 and the bracket 49 was shortened so that the effective distance between the clutch mechanism 48 and the bail arm 20 remains the about same. Each time there is slack in the core 32b, the slider 66 ratchets forward in this manner to automatically tension the cable and remove the slack. Therefore, the self adjusting mechanism 34 enables the clutch mechanism to operate within its optimum operating range over time without manual adjustment.

Although particular embodiments of the invention have been described in detail, it will be understood that the invention is not limited correspondingly in scope, but includes all changes and modifications coming within the, spirit and terms of the claims appended hereto.

What is claimed is:

1. A lawn mower having a drive system, said lawn mower comprising:
    a handle;
    a lever pivotally supported at a rear end of said handle;
    a clutch mechanism for engaging and disengaging the drive system;
    a control case secured to said handle between said lever and said clutch assembly;
    a cable having a conduit and a flexible core extending through the conduit, said core connecting said lever and said clutch mechanism; and
    a self-adjusting mechanism including a slider supported by said control case, said slider engagable with a rear end of said conduit and having ratchet teeth thereon, a spring element forwardly urging said slider toward said rear end of said conduit, and a lock pin secured to said control case and engagable with said ratchet teeth of said slider for allowing forward movement of said slider relative to said control case and preventing rearward movement of said slider relative to said control case to automatically adjust tension of said cable, wherein said control case has a side wall which forms a longitudinally extending groove having an open outer side and said slider is longitudinally movable within said groove.

2. The lawn mower according to claim 1, wherein said handle engages said control case adjacent said groove.

3. The lawn mower according to claim 1, wherein said groove has forward and rearward facing abutments for limiting longitudinal movement of said slider.

4. A lawn mower having a drive system, said lawn mower comprising:
    a handle;
    a lever pivotally supported at a rear end of said handle;
    a clutch mechanism for engaging and disengaging the drive system;
    a control case secured to said handle between said lever and said clutch assembly:
    a cable having a conduit and a flexible core extending through the conduit, said core connecting said lever and said clutch mechanism; and
    a self-adjusting mechanism including a slider supported by said control case, said slider engagable with a rear end of said conduit and having ratchet teeth thereon, a spring element forwardly urging said slider toward said rear end of said conduit, and a lock pin secured to said control case and engagable with said ratchet teeth of said slider for allowing forward movement of said slider relative to said control case and preventing rearward movement of said slider relative to said control case to automatically adjust tension of said cable, wherein said slider is located generally outside said control case and said lock pin is located generally within said control case.

5. The lawn mower according to claim 4, wherein said lock pin has a handle portion extending out of said control case for manually disengaging said lock pin from said slider.

6. A lawn mower having a drive system, said lawn mower comprising:
    a handle;
    a lever pivotally supported at a rear end of said handle;
    a clutch mechanism for engaging and disengaging the drive system;
    a control case secured to said handle between said lever and said clutch assembly;
    a cable having a conduit and a flexible core extending through the conduit, said core connecting said lever and said clutch mechanism; and
    a self-adjusting mechanism including a slider supported by said control case, said slider engagable with a rear end of said conduit and having ratchet teeth thereon, a spring element forwardly urging said slider toward said rear end of said conduit, and a lock pin secured to said control case and engagable with said ratchet teeth of said slider for allowing forward movement of said slider relative to said control case and preventing rearward movement of said slider relative to said control case to automatically adjust tension of said cable, wherein said ratchet teeth are a rack of longitudinally spaced teeth which are closed on at least one side.

7. A lawn mower having a drive system, said lawn mower comprising:

a handle;

a lever pivotally supported at a rear end of said handle;

a clutch mechanism for engaging and disengaging the drive system;

a control case secured to said handle between said lever and said clutch assembly;

a cable having a conduit and a flexible core extending through the conduit, said core connecting said lever and said clutch mechanism; and a self-adjusting mechanism including a slider supported by said control case, said slider engagable with a rear end of said conduit and having ratchet teeth thereon, a spring element forwardly urging said slider toward said rear end of said conduit, and a lock pin secured to said control case and engagable with said ratchet teeth of said slider for allowing forward movement of said slider relative to said control case and preventing rearward movement of said slider relative to said control case to automatically adjust tension of said cable, wherein said self-adjusting mechanism further includes means for selectively securing said slider in a rearward-most position which includes an opening in said slider and a removable fastener selectively extending through said opening to prevent forward movement of said slider, and wherein said control case includes left and right halves and said removable fastener is a screw for securing said left and right halves together.

8. A lawn mower having a drive system, said lawn mower comprising:

a handle;

a lever pivotally supported at a rear end of said handle;

a clutch mechanism for engaging and disengaging the drive system;

a control case secured to said handle between said ever and said clutch assembly and having a side wall which forms a longitudinally extending groove with an open outer side, said handle engaging said control case adjacent said outward side of said groove;

a cable having a conduit and a flexible core extending through the conduit, said core connecting said lever and said clutch mechanism; and a self-adjusting mechanism including a slider longitudinally movable within said groove of said control case, said slider engagable with a rear end of said conduit and having a rack of longitudinally spaced ratchet teeth thereon, a spring element forwardly urging said slider toward said rear end of said conduit, and a lock pin secured within said control case and engagable with said ratchet teeth of said slider for allowing forward movement of said slider relative to said control case and preventing rearward movement of said slider relative to said control case to automatically adjust tension of said cable.

9. The lawn mower according to claim 8, wherein said lock pin has a handle portion extending out of said control case for manually disengaging said lock pin from said slider.

10. The lawn mower according to claim 8, wherein said ratchet teeth are closed at a side at an inner side of said groove.

11. The lawn mower according to claim 8, wherein said self-adjusting mechanism further includes means for selectively securing said slider in a rearward-most position.

12. The lawn mower according to claim 11, wherein said securing means includes a opening in said slider and a removable fastener selectively extending through said opening to prevent forward movement of said slider.

13. The lawn mower according to claim 12, wherein said control case includes left and right halves and said removable fastener is a screw for securing said left and right halves together.

14. A self-adjusting mechanism for a cable having a conduit and a flexible core extending through the conduit, said mechanism comprising:

a housing including at least two portions secured together by at least one removable fastener;

a slider supported by said housing and movable relative to said housing, said slider engagable with a rear end of said conduit and having ratchet teeth thereon;

a spring element forwardly urging said slider toward said rear end of said conduit;

a lock pin secured to said housing and engagable with said ratchet teeth of said slider for allowing forward movement of said slider relative to said housing and preventing rearward movement of said slider relative to said housing to automatically adjust tension of the cable; and means for selectively securing said slider in a rearward-most position, said securing means including said removable fastener.

15. The self-adjusting mechanism according to claim 14, wherein said securing means includes an opening in said slider and said removable fastener selectively extends through said opening to prevent forward movement of said slider.

\* \* \* \* \*

UNITED STATES PATENT AND TRADEMARK OFFICE
CERTIFICATE OF CORRECTION

PATENT NO.  : 5,842,552
DATED       : December 1, 1998
INVENTOR(S) : William E. Colber, Jr., et al.

It is certified that error appears in the above-indentified patent and that said Letters Patent is hereby corrected as shown below:

Claim 8, line 7 "ever" should be --lever--.

Signed and Sealed this

Thirtieth Day of March, 1999

Attest:

Q. TODD DICKINSON

*Attesting Officer*     *Acting Commissioner of Patents and Trademarks*